July 14, 1959     J. P. BOGATER ET AL     2,894,277
DECK LID HINGE WITH ADJUSTABLE COUNTERBALANCE
Filed Nov. 18, 1953     3 Sheets-Sheet 1
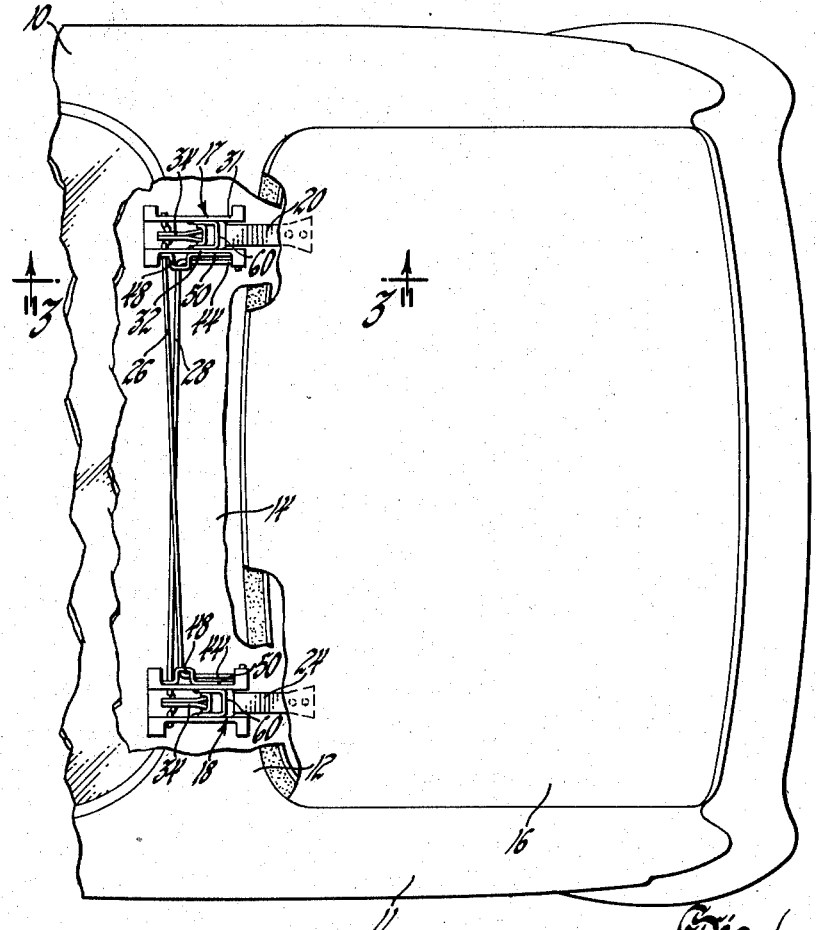
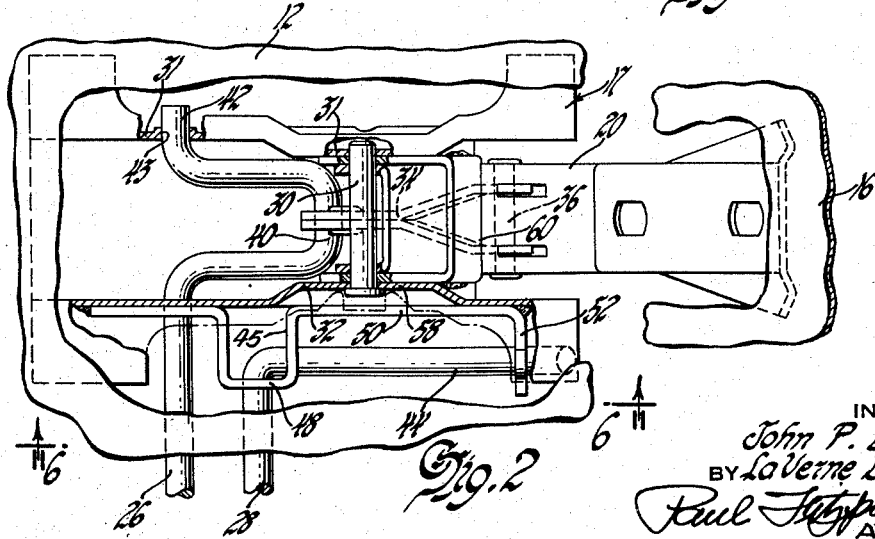
INVENTORS
John P. Bogater &
BY LaVerne B. Ragsdale
ATTORNEY July 14, 1959 J. P. BOGATER ET AL 2,894,277
DECK LID HINGE WITH ADJUSTABLE COUNTERBALANCE
Filed Nov. 18, 1953 3 Sheets-Sheet 3
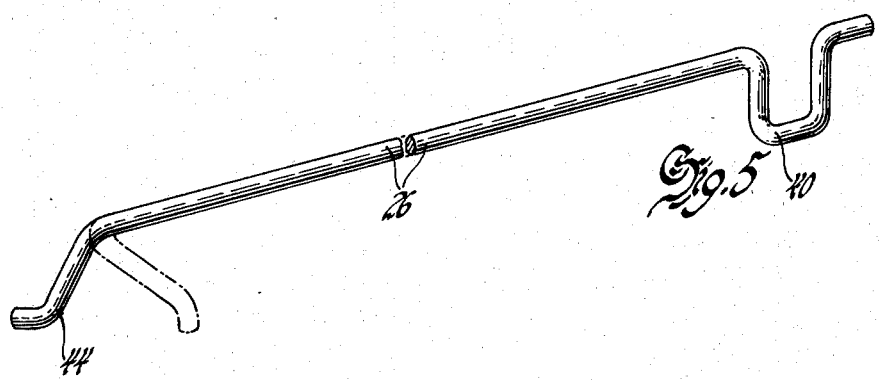
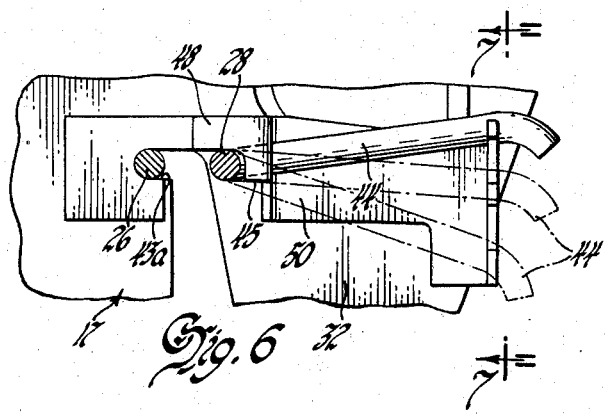
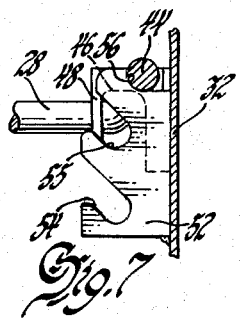
INVENTORS
John P. Bogater &
BY LaVerne B. Ragsdale
Paul Fitzpatrick
ATTORNEY

United States Patent Office 2,894,277
Patented July 14, 1959

2,894,277

DECK LID HINGE WITH ADJUSTABLE COUNTERBALANCE

John P. Bogater, Detroit, and La Verne B. Ragsdale, Dearborn, Mich., assignors to General Motors Corporation, Detroit, Mich., a corporation of Delaware Application November 18, 1953, Serial No. 392,944

4 Claims. (Cl. 16—180)

This invention relates to hinge and counterbalance apparatus for the rear deck lid of an automobile. balance appaartus for the rear deck lid of an automobile.

Nearly all modern passenger automobiles are provided with a rear deck compartment closed by a hinged lid, and counterbalance means are provided in combination with the hinge structure to assist in opening the deck lid and to hold the lid in raised position. One preferred form of counterbalance means comprises a pair of torsion rods mounted in the rear deck compartment, each rod having one end pivoted on one hinge box adjacent one side of the deck compartment and having a crank portion adjacent this end connected to the hinge strap which supports the deck lid. Each rod extends transversely of the automobile body within the compartment and has its other end anchored on the hinge box remote from the crank end. The torque rods are twisted when the structure is assembled to provide a counterbalance and hold-open force.

Torsion rods of this nature are often preferred to compression springs located in the hinge boxes because of the ease of assembling the parts when the deck lid is mounted on the body. However, due to variations in the spring strength of different torsion rods and variations in the size and weight of different deck lids, at times it has been difficult to obtain a desired counterbalance and hold-open action when torsion rods of this type were used, particularly when similar torsion rods are used in different automobile models having deck lids of varying sizes, shapes and weights.

The invention provides a novel means for adjusting the counterbalance strength of the torsion rods to compensate for variations in torque strength and for variations in size and weight of deck lids so that a single type of torsion rod can be used in mass production manufacture, and a desired counterbalance and hold-open action may be obtained despite the above mentioned variations.

According to the invention, first means are provided for anchoring one end of each torsion rod to the automobile body to obtain a first degree of torque and other means are provided for anchoring the end of each rod at locations angularly displaced from the first anchor location to obtain different degrees of torque.

Other features and advantages of the invention will be apparent from the following description and from the drawings, in which:

Fig. 1 is a fragmentary top plan view of the rear end of an automobile, portions being broken away to show underlying structure;

Fig. 2 is an enlarged section taken in a horizontal plane through one of the hinge boxes along the line 2—2 of Fig. 4;

Fig. 5 is a perspective view of one of the torsion rods removed from the automobile;

Fig. 6 is a detail section through a portion of one of the hinge boxes along the line 6—6 of Fig. 2; and Fig. 7 is a section looking at the left of Fig. 6 along the line 7—7 thereof.

Figure 3:
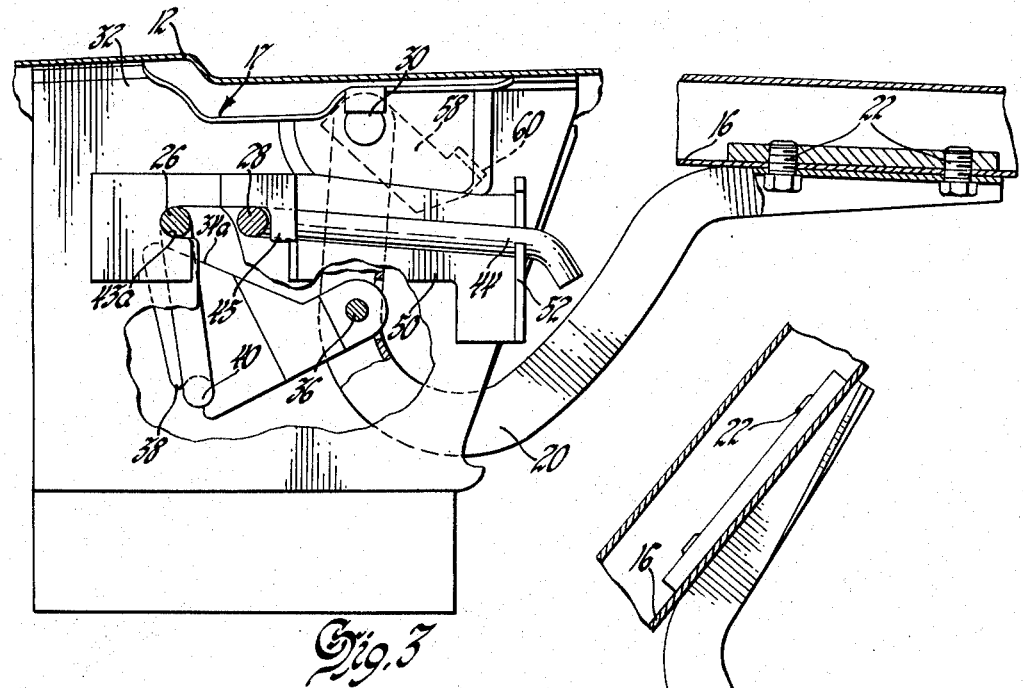
Fig. 3 is an enlarged vertical section taken along the line 3—3 of Fig. 2, the deck lid being closed.
Figure 4:
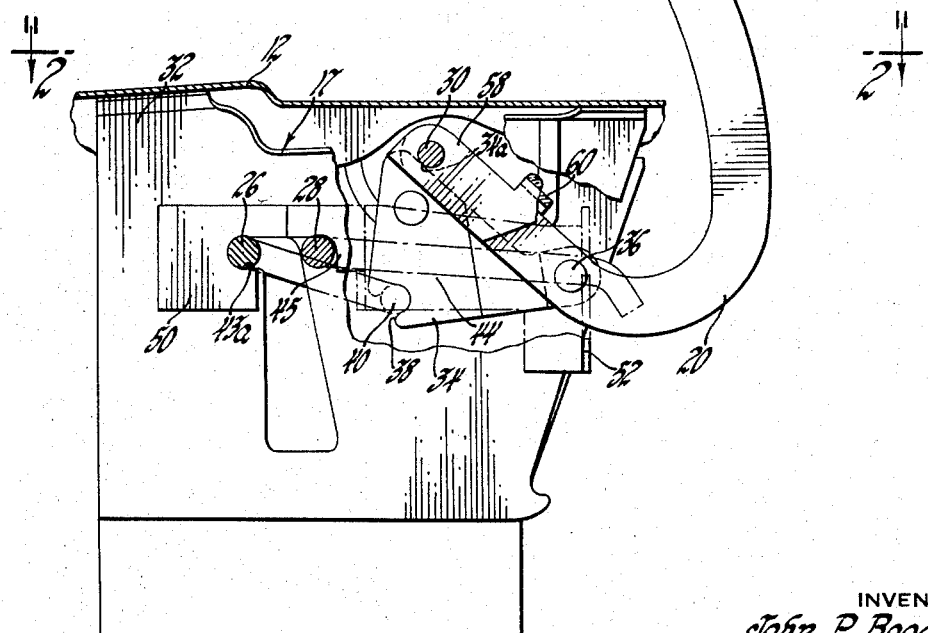
Fig. 4 is a section similar to Fig. 3, but showing the deck lid open.

Referring now more particularly to the drawings, an automobile body is shown fragmentarily including rear fenders 10 and 11 and a rear deck panel 12, a portion of which is broken away in Fig. 1 to show the interior of a rear deck compartment 14. The opening to compartment 14 is closed by a deck lid 16 which is hingedly mounted by means including two hinge boxes 17 and 18 and hinge straps 20 and 24. Boxes 17 and 18 are mounted on the body in spaced relationship within the compartment 14, adjacent opposite sides of said compartment, and the goose-neck hinge strap 20, which is channel shaped in transverse section, has one end pivotally mounted on the hinge box 17 and the other end connected to the inner panel of the deck lid 16 by means of screws 22 (Figs. 3 and 4). Similarly, goose-neck hinge strap 24 is connected between the hinge box 18 and the deck lid 16 adjacent the other side of the deck lid opening.

In order to provide a counterbalance and hold-open action, a pair of torsion rods 26 and 28 extend transversely of the automobile body within the compartment 14, each rod being connected between the body and one of the hinge straps 20, 24, and each rod being twisted to provide a counterbalance and hold-open force. Since the torsion rods are identical, and since the construction is the same at both sides of the deck compartment, the construction at the right side only will be described in detail. The construction is duplicated at the left side as shown in Fig. 1.

The goose-neck hinge strap 20 is pivotally mounted on the automobile body on a pin 30 (Figs. 2, 3 and 4) which is journaled between opposite side walls 31 and 32 of the hinge box 17. A link 34, comprising two sheet metal stampings which are riveted together, is pivotally mounted on a pin 36 journaled between the side walls of the channel shaped goose-neck hinge strap. Adjacent the free end of this link is a notch 38 which receives an offset crank portion 40 of the torsion rod 26. The adjacent end 42 of the rod is pivotally mounted on the body, this end 42 extending through an opening 43 in the outer side wall 31 of the hinge box as shown in Fig. 2. The inner side wall 32 has a vertical slot provided at its upper end with an aligned shoulder 43a through which the torsion rod passes.

The other end of the rod 26 is non-rotatably anchored to the remote hinge box at the other side of the car, and since the structure is identical at both sides of the car, the details of the anchor construction are shown with relation to the anchoring of the torsion rod 28 on the hinge box 17.

The torsion rod has a bent end 44 which is hooked around a guide support 45 formed by a slot 46 in the bottom edge of the forward side wall of an offset portion 48 of a support bracket 50 which is welded to the inner side wall 32 of the hinge box. The bottom edge of the end wall of bracket portion 48 is suitably cut away (Fig. 6) to admit the portion of rod 26 protruding from shoulder 43a of side wall 32 and the portion of rod 28 adjacent its bent end 44. At its forward end, bracket 50 has a right angular flange 52 in which are formed three spaced notches 54, 55 and 56, as shown in Fig. 7. When the parts are assembled, the bent end 44 of the torsion rod is engaged in one of these notches, the torsion rod being twisted in an amount necessary to engage the bent end 44 in the selected notch. This assembly provides a first degree of torque. If a different degree of torque is desired, the bent end 44 of the torsion rod may be removed from the first selected notch and engaged in one of the other notches, the torsion rod now being twisted in a different amount.

For example, in cars with a relatively small and light deck lid, it may be desirable to twist the torsion rod only a sufficient amount so that the bent end 44 of the rod is engaged in the lower notch 54; whereas for cars with a larger or heavier deck lid, it may be desirable to twist the torsion rod a greater amount so that the bent end is engaged in the middle notch 55 of the upper notch 56, providing a greater degree of torque or counterbalance force. Also, if variations are encountered in the amount of torque exerted by different rods, an adjustment may be made by changing the notch engaged by the bent end of the rod to change the degree of torque or counterbalance exerted.

By selecting among the three notches on each side of the car, nine variations may be made in total combined torque of the two rods 26 and 28. This number of variations in combined torque may be doubled if one rod varies from the other in spring strength when twisted. With this arrangement, there would be eighteen possible variations of total combined torque.

Fig. 3 shows the position of the parts when the deck lid is closed, each torque rod being twisted to provide a counterbalance force in the direction of lid opening movement. When the deck lid is opened, as shown in Fig. 4, the torsion rods partially untwist, aiding the manual opening of the deck lid. When the lid is open, the surface 34a of link 34 strikes pin 30 and a positive stop for preventing further opening movement of the lid is obtained through a yoke 58 which is welded to the sides 31 and 32 of the hinge box. The base portion 60 of the yoke which extends between sides 31 and 32 is abutted by the hinge strap 20 at the extreme limit of hood opening movement.

While we have shown and described one embodiment of our invention, it is capable of many modifications. Changes, therefore, in the construction and arrangement may be made without departing from the spirit and scope of the invention as set forth in the appended claims.

We claim:

1. In an automobile having a body with a deck compartment and a deck lid therefor, a hinge and counterbalance for the deck lid, including: a hinge strap having one end pivotally connected to the body and the other end connected to the lid; a link depending from said strap intermediate the ends thereof; a torsion rod extending transversely of the body within said compartment, said rod having a crank portion adjacent one end connected to said link and having a bent portion at its other end, the link and the crank portion of the rod forming the sole members of a toggle; means pivotally connecting said one end of the rod to the body; first means for anchoring the bent end of the rod to said body to obtain a first degree of torque; and second means located in fixed spaced relationship to said first means for anchoring said bent end of the rod to the body to obtain a predetermined different degree of torque.

2. In a vehicle body having a deck compartment and a deck lid therefor movable to open and closed positions, a hinge and counterbalance for the deck lid comprising, in combination, a hinge box mounted on said body and having spaced walls, a hinge strap secured to said lid, a hinge pin extending between the walls of said box for mounting said hinge strap thereon, a torsion rod extending transversely of said body within said compartment and including a crank portion intermediate the ends thereof, a link having one end thereof pivotally secured to said hinge strap and the other end thereof pivotally secured to the crank portion of said torsion rod whereby said link and crank portion provide a toggle operatively interconnecting said hinge strap and rod, said link being engageable with said hinge pin upon opening movement of said lid to prevent said toggle from moving overcenter, first means for anchoring one end of said torsion rod on said body to obtain a first degree of torque, and second means located in fixed spaced relationship to said first means for anchoring said one end of said rod to said body to obtain a predetermined different degree of torque.

3. In a vehicle body having a deck compartment and a deck lid therefor, a hinge and counterbalance for the deck lid comprising, in combination, a hinge strap having one end thereof swingably mounted on said body and the other end thereof secured to said lid, a torsion rod extending transversely of said body within said compartment, said rod including a crank portion adjacent one end thereof and a bent portion at the other end thereof, a member pivotally secured to said hinge strap and pivotally secured to the crank portion of said torsion rod, the member connected to said strap and said crank portion forming the sole members of a toggle interconnecting said hinge strap and said rod, means pivotally connecting said one end of said rod to the body, first means for anchoring the bent end of said rod to said body to obtain a first degree of torque, and second means located in fixed spaced relationship to said first means for anchoring said bent end of said rod to said body to obtain a predetermined different degree of torque.

4. In a vehicle body having a deck compartment and a deck lid therefor movable to open and closed positions, a hinge and counterbalance for the deck lid comprising, in combination, a pair of spaced hinge boxes mounted on said body, each having spaced walls, a hinge strap swingably mounted on each of said boxes between the walls thereof and secured to said lid, a pair of torsion rods extending between said boxes, each having a crank portion adjacent one end thereof swingably mounted between the walls of one of said hinge boxes and each having a bent portion at the other end thereof located adjacent the other of said hinge boxes, a pair of members, each being pivotally secured to one of said hinge straps and to the crank portion of one of said torsion rods, each of said members connected to said straps and said crank portions forming the sole members of a toggle interconnecting each of said hinge straps and each of said rods, first means for anchoring the bent portion of each said torsion rods on the adjacent other of said hinge boxes to obtain a first degree of torque, and second means located in fixed spaced relationship to said first means for anchoring said bent portions of each of said rods on said adjacent hinge boxes to obtain a predetermined different degree of torque.

References Cited in the file of this patent

UNITED STATES PATENTS

| 167,989 | Comfort | Sept. 21, 1875 |
| 1,853,658 | Briskin | Apr. 12, 1932 |
| 2,602,957 | Anderson | July 15, 1952 |
| 2,688,764 | Squire | Sept. 14, 1954 |

UNITED STATES PATENT OFFICE
CERTIFICATE OF CORRECTION

Patent No. 2,894,277                                    July 14, 1959

John P. Bogater et al.

It is hereby certified that error appears in the printed specification of the above numbered patent requiring correction and that the said Letters Patent should read as corrected below.

Column 1, lines 16 and 17, strike out "balance apparatus for the rear deck lid of an automobile. balance appaartus" and insert instead -- apparatus, and more particularly to hinge and counterbalance apparatus--; column 3, line 10, for "notch 55 of the" read -- notch 55 or the --.

Signed and sealed this 29th day of December 1959.

(SEAL)
Attest:

KARL H. AXLINE                                           ROBERT C. WATSON

Attesting Officer                                        Commissioner of Patents